Patented May 12, 1936

2,040,380

UNITED STATES PATENT OFFICE 2,040,380

BROMINATED VAT DYESTUFFS OF THE BENZANTHRONYLAMINOANTHRAQUINONE SERIES

Ernst Honold and Rudolf Müller, Frankfort-on-the-Main-Fechenheim, Germany, assignors to General Aniline Works, Inc., New York, N. Y., a corporation of Delaware No Drawing. Application October 16, 1934, Serial No. 748,530. In Germany October 25, 1933

2 Claims. (Cl. 260—36)

Our invention relates to new brominated vat dyestuffs and process of making same.

If the vat dyestuffs of the general formula

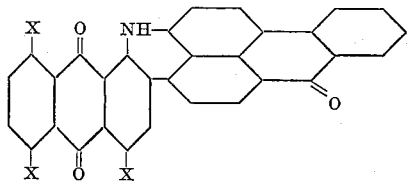

wherein one X means an acylamino-group and the other X's mean hydrogen, which dyestuffs are described in U. S. Patents 1,850,562 and 1,877,947, are treated according to the usual methods with a halogen or a halogenating agent, in varying yields, often together with considerable quantities of decomposition products, mixtures of di- to tetrahalogenated derivatives are obtained, which, it is true, are useful as intermediates for further conversion reactions, but themselves only dye the fiber dull shades of no practical interest.

Our present invention relates to low brominated derivatives of the said starting materials which are in contradistinction to the above mentioned products of great tinctorial value owing to the fact that they are entirely free from decomposition products. These are obtained by treating the said initial products with a brominating agent under such mild conditions as are not customary for the halogenation of vat dyestuffs. The reaction may be carried out with or without the addition of a diluent and a suitable catalyst.

The products obtained according to the above described processes correspond with the general formula

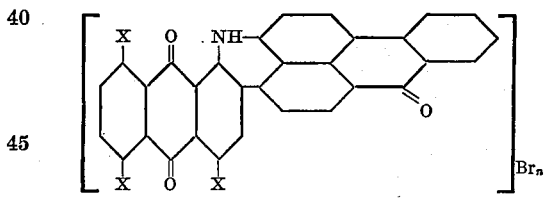

wherein one X means an acylamino-group and the other X's mean hydrogen, $n$ is approximately the number 2. The new dyestuffs dye the fiber bluish green shades which in comparison with the shades of the initial products are superior as regards purity, bluish tint and fastness to chlorine.

In order to further illustrate our invention the following example is given the parts being by weight; but we wish it, however, to be understood that our invention is not limited to the particular products nor reacting conditions mentioned therein:—

*Example*

25 parts of the dyestuff obtained according to U. S. Patent 1,850,562 by acting with benzoyl chloride on the alkaline condensation product of 1-(bz-1-benzanthronyl-amino)-5-aminoanthraquinone are finely divided and a solution of 16 parts of bromine in about 200 parts of glacial acetic acid, 25 parts of sodium acetate and a small quantity of iodine are added thereto. The mixture is boiled for some hours under reflux while stirring. The dyestuff formed contains 11 to 12% of bromine and dyes cotton from a bluish violet vat fast bluish olive shades of an improved fastness to chlorine. The dyestuff dissolves in concentrated sulfuric acid with a green color. It corresponds to the formula

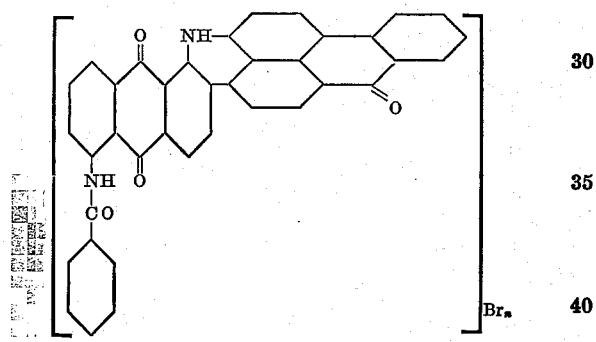

wherein $n$ is approximately the number 2.

The bromination may be carried out likewise for instance by acting with bromine in the presence of tetrachloroethane or nitrobenzene with or without the addition of iodine acting as catalyst.

In the same manner the products obtained by the action of for instance benzoylchloride or acetic acid anhydride on the alkaline condensation products of 1-(bz-1-benzanthronylamino)-4- and -8-aminoanthraquinone yield, when likewise brominated dyestuffs dyeing bluish green shades of great purity and fastness to chlorine.

We claim:—

1. Brominated vat dyestuffs of the general formula

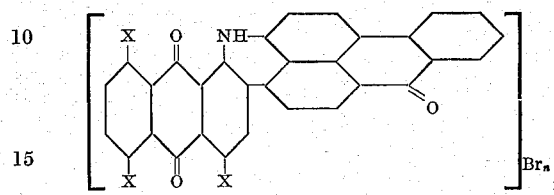

wherein one X means an acetylamino- or benzoylamine group and the other X's mean hydrogen, $n$ is approximately the number 2, which dyestuffs dye the fiber bluish green shades of great purity and fastness to chlorine.

2. The brominated vat dyestuff of the formula

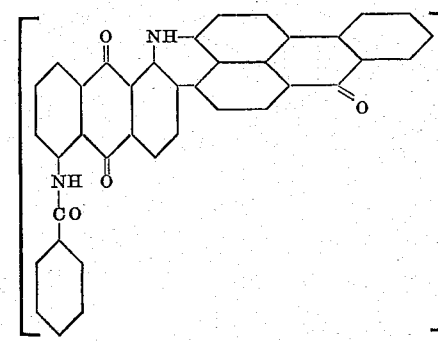

wherein $n$ is approximately the number 2, which dyestuff dissolves in concentrated sulfuric acid with a green color and dyes cotton from a bluish violet vat bluish olive shades of a good fastness, particularly to chlorine.

ERNST HONOLD.
RUDOLF MÜLLER.